United States Patent [19]

Peichl et al.

[11] 4,193,621
[45] Mar. 18, 1980

[54] BUMPERS FOR MOTOR VEHICLES

[75] Inventors: Rolf Peichl; Günter Kaulmann, both of Osnabrück, Fed. Rep. of Germany

[73] Assignee: Wilhelm Karmann GmbH, Osnabrück, Fed. Rep. of Germany

[21] Appl. No.: 890,453

[22] Filed: Mar. 27, 1978

[30] Foreign Application Priority Data

Apr. 9, 1977 [DE] Fed. Rep. of Germany ....... 2715986

[51] Int. Cl.² .............................................. B60R 19/06
[52] U.S. Cl. ..................................... 293/142; 293/155
[58] Field of Search ...................... 293/71 R, 60-63, 293/142, 155; 15/45

[56] References Cited

U.S. PATENT DOCUMENTS

| 4,030,744 | 6/1977 | Schwochow et al. | 293/71 R |
| 4,039,215 | 8/1977 | Minhinnick | 293/71 R |

*Primary Examiner*—Joseph E. Valenza
*Assistant Examiner*—Gene A. Church
*Attorney, Agent, or Firm*—Max Fogiel

[57] ABSTRACT

A flexible shield and bumper combination, more particularly for a private motor vehicle, has a substantially straight, rigid bumper and a yieldable, wrap round shield of U-shape mounted on the bumper.

The shield is attached to the opposite sides of the vehicle by means of slidable connections. The shield is so constructed and secured to the bumper that it takes up relatively light frontal or obliquely frontal shocks and transfers heavier shocks to the bumper.

20 Claims, 6 Drawing Figures

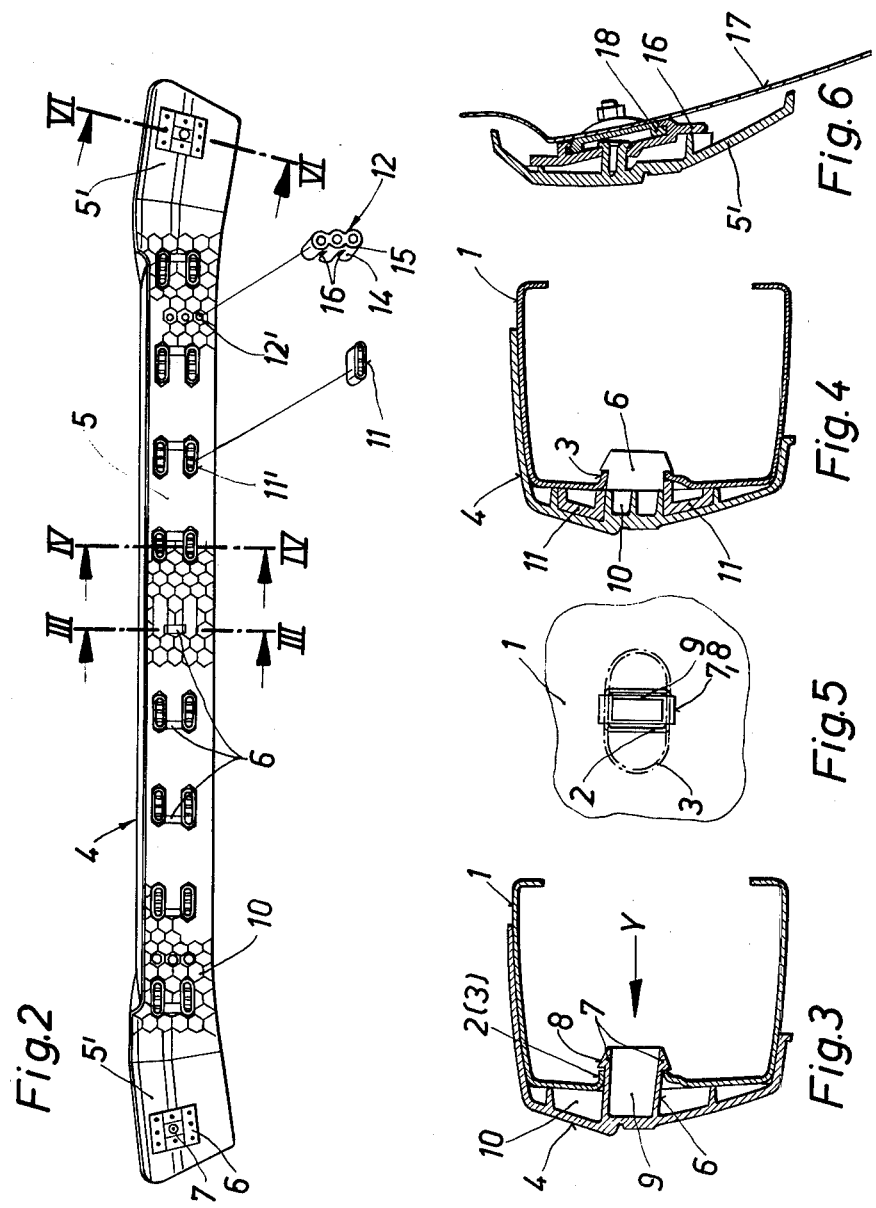

BUMPERS FOR MOTOR VEHICLES

Prior Application: Priority, Federal Republic of Germany Apr. 9, 1977 Application No. P 27 15 986.0.

The present invention relates to bumpers for motor vehicles, more particularly, but not exclusively, private cars.

The aim of the invention is to provide such a bumper with a flexible shield which is so constructed and secured to the bumper that it takes up relatively light frontal or obliquely frontal shocks without permanent deformation of the shield and which transmits heavier shocks to the bumper before permanent deformation occurs.

To this end, the present invention provides a bumper for a motor vehicle having a U-shaped shield fitted thereto by its transverse portion, there being a central fixing between the bumper and the shield which is laterally stable in position and a plurality of further fixings which are laterally displaceable to a limited extent, said fixings supporting the shield for displacement in the longitudinal direction of the vehicle towards the bumper, in use thereof, the lateral end portions of the shield being disposed in relation to the bumper to extend round the sides of the vehicle.

Preferably, the bumper is a substantially straight member and slidable connections are provided for fixing the lateral end portions of the shield to the vehicle body.

A specific embodiment of the present invention will now be described by way of example, and not by way of limitation, with reference to the accompanying drawings in which:

FIG. 2 shows a rear view of the shield, substantially in the direction of the arrow X in FIG. 1;

FIG. 3 shows a section through the shield secured to the bumper, substantially on line III—III in FIG. 2;

FIG. 4 shows a further section through the shield secured to the bumper, substantially on line IV—IV in FIG. 2;

FIG. 5 shows a partial view in the direction of the arrow Y in FIG. 3; and

FIG. 6 shows a section through a lateral end of the shield, substantially on line VI—VI in FIG. 2, with its displacement holding means on a lateral face of the body.

Figure 1:
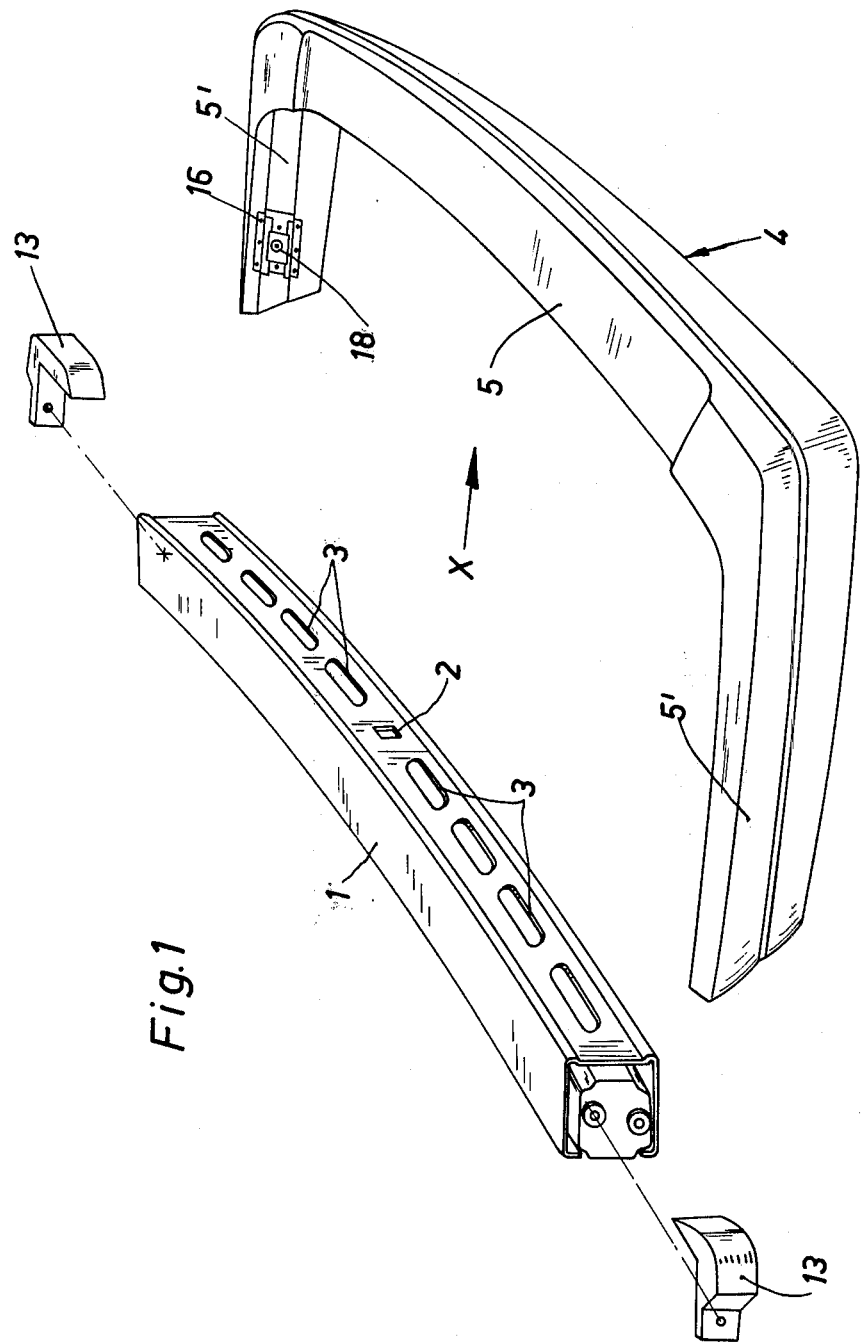
FIG. 1 shows an oblique view of a bumper and a shield before their assembly.

With reference to the accompanying drawings, in FIG. 1, a bumper which is fitted rigidly or with shock-absorption to the front or rear end of a motor vehicle, particularly a private car, is designated by 1. The bumper 1 consists of a substantially straight steel girder which has no lateral bends and is substantially C-shaped in cross-section and which is provided at its front face with a central hole 2 and a plurality of holes 3 disposed at both sides thereof. The bumper 1 can be a rough member which is unmachined with regard to its surfaces since it is to be covered by a shield 4.

The shield 4 is of resiliently or plastically deformable plastics material, synthetic rubber or the like and consists of a main portion 5 which can engage over, and be connected to, the bumper 1 at its front face which is provided with the holes 2, 3 so as at least partially to cover the top and bottom surfaces and the lateral ends of the bumper, the lateral end portions 5' of the shield being extended round the sides of the vehicle body. The flexible shield 4 is preferably made in one piece but it may also consist of a plurality of parts fixed together.

The connection of the shield to the bumper 1 is effected through attachment pins 6 which are formed integrally on the inside of the front face of the main portion 5 of the shield 4. The pins have hook-shaped or bead-shaped thickened portions 7 at their free ends, with camming surfaces 8, enabling the pins to be pressed into the holes 2, 3 provided in the bumper 1, as can be seen particularly clearly from FIGS. 3 and 5, so that the hook-shaped or bead-shaped thickened portions 7 engage the material of the bumper at opposite edges of the holes. The hook-shaped or bead-shaped thickened portions 7 are supported in spaced apart relation to one another by one or more webs or walls 9 which are disposed vertically and form the shanks of the pins. The vertical dimensions of the holes 2, 3 are chosen such that when the pins 6 are pressed into the holes, the webs or walls 9 yield laterally or horizontally to allow the thickened portions 7 to pass through the holes 2, 3 and thereafter spring back so that the thickened portions take up their locking position. In the embodiment illustrated in FIGS. 3 and 5, two vertical webs or walls 9 are provided to support the hook-shaped or bead-shaped thickened portions 7, namely as side walls of a narrow rectangular box-girder hollow sectioned pin 6.

As can be seen from FIG. 1 in conjunction with FIG. 5, the central hole 2 in the bumper 1, which receives a central attachment pin 6 on the main portion 5 of the shield, is dimensioned closely to the same width as the pin shank, not only in its vertical extent but also in its horizontal extent, and so locates the central pin against lateral displacement in the sense of a central fixing of the shield 4 and therefore fixes the centre point of the shield relative to the bumper. The other holes 3 in the bumper 1, on the other hand, have a greater horizontal extent than the hole 2 to take up tolerances in the positioning of the other attachment pins.

Apart from this, continuous or local ribbed areas 10 are formed on the inside of the front face of the shield 4 (FIG. 2) and engage the bumper in the manner of an intermediate cushion (FIGS. 3 and 4). The ribbed areas 10 are preferably provided in the regions of the attachment pins 6 the pins being integrated into the ribbed areas. In the example shown in FIG. 2, the ribbed areas 10 are constructed with intersecting ribs which form a honeycomb of pockets of hexagonal shape; the ribbed areas could, however, also be formed to present round pockets or pockets of other polygonal shape.

In their height and longitudinal extent respectively, the ribs making up the ribbed areas 10 are related to the length of the attachment pins 6 in such a manner that when the shield is secured to the bumper 1 (FIGS. 3 and 4), the ribs engage the front face of the bumper with or without loading.

Furthermore, in order to take up and pass on impact energy before permanent visible deformation occurs in the shield 4, separate supporting elements 11, 12, 13 of a non-flexible, solid material, are provided at intervals at the inside of the front face of the shield. These supporting elements 11, 12, 13 consist of hollow or solid moulded pieces detachably fixed to the shield 4. These moulded pieces may advantageously be located by the ribs of the ribbed and/or honeycomb areas 10 by wedging or by hooking.

In FIG. 2, two supporting elements 11 and 12 are shown in the not yet inserted state. The supporting element 11 is a moulded piece which is adapted, for example, to fit into a hollow region 11' in a ribbed or honeycomb area 10 and to be wedged therein. In the case of the supporting element 12, on the other hand, this has a plurality of moulded pieces 14 to fit respectively into individual honeycomb pockets 12' projecting from an upper bridge-like connection 15, there being gripping slits 16 remaining free between the moulded pieces 15 to receive individual ribs of the honeycomb and the whole being able to be positioned with a wedging and a hooking action. The supporting elements 11 may be so constructed and dimensioned that they lie flush with the free edges of the ribs of the honeycomb or ribbed areas 10 when they are fully inserted, as can be seen in the upper part of FIG. 4; they may, however, also project with their upper marginal face entirely or locally above the free edges of the ribs when they are fully inserted, as can be seen in the lower part of FIG. 4, and so, either wholly or locally, take over the function of cushioning the shield 4 on the front face of the bumper 1, the elements 11 just fitting in the space between the front face of the bumper and the inside of the front face of the shield or being lightly clamped between these faces. This also applies to the supporting element 12 with the bridge-like connection 15, insofar as the ribs of the honeycomb areas in question, over which the gripping slits 16 engage, are not shortened in height in relation to the remaining ribs. They could, however, be shortened to allow the element 12 to be positioned flush with the free edges of the ribs when fully inserted.

For the corner regions of the shield 4, which are particularly in danger, the special supporting elements 13 in the form of angle members, to be seen in FIG. 1, are preferably provided, which consist of solid moulded pieces, made in one piece, and shaped on their outside to fit the curvature of the inside face of the shield 4 to support the corners of the shield from the bumper 1.

The lateral end portions 5' of the shield 4 provided to protect the front side portions of the vehicle forwardly of the wheel arches, each have at least one guide member 16 mounted on their inside face which, as can be seen in particular from FIG. 6, is held in sliding engagement with a horizontally extending rail 18 secured to the adjacent side face 17 of the vehicle body. The guide members 16 and/or the rails 18 are preferably so dimensioned in their longitudinal extent, as measured lengthwise of the vehicle, that, after a predetermined displacement of the end portions 5', the guide members 16 disengage the rails.

A flexible shield 4 as described with reference to the accompanying drawings, can be made simply and cheaply and since the shield substantially covers the bumper 1, it makes surface finishing of the bumper, particularly its chromium-plating, unnecessary. The bumper 1 can be a simple girder section, which is made very stable, because shaping with respect to the vehicle body is no longer of any importance, this being taken over by the shield which can be given any desired external profile. As a result of the method of fitting the shield 4 to the bumper 1 and to the side faces 17 of the body, compensation for tolerance and expansion of the shield and of the bumper is achieved with satisfactory central fixing, and the onset of any buckling stresses in the shield in thereby avoided. The shield is simple to mount and also to replace and, as a result of its rib and/or honeycomb areas provided at its inside face taken in conjunction with the supporting elements 11, 12, 13, it serves to take up light frontal or obliquely frontal bumps without permanent deformation, while heavier collisions are transmitted to the bumper before permanent deformation of the shield occurs.

We claim:

1. A bumper for a motor vehicle having a U-shaped shield with a transverse portion attached to said bumper, central securing means between the bumper and the shield which is laterally stable in position, a plurality of further securing means which are laterally displaceable to a limited extent, said securing means supporting the shield for displacement in the longitudinal direction of the vehicle towards the bumper, said shield having lateral end portions disposed in relation to the bumper to extend round the sides of the vehicle, said shield being flexible and being comprised of at least one piece of resiliently material.

2. A combined bumper and shield as defined in claim 1 wherein said securing means includes holes in the bumper and attachment pins on the shield, said attachment pins having thickened portions at their free ends with camming surfaces for use in forcing the second portions of the pins through the holes in the bumper, each pin having a shank formed from laterally yieldable walls, said thickened portions of each attachment pin being supported in spaced relation to one another by at least one of said laterally yieldable walls.

3. A combined bumper and shield as defined in claim 1 wherein said central securing means includes a pin and hole fitting closely with one another both laterally and vertically, said further securing means including pins and holes elongated laterally relative to the pins.

4. A combined bumper and shield as defined in claim 1, wherein said shield has ribbed areas engaging the bumper and forming an intermediate cushion between the bumper and the shield.

5. A combined bumper and shield as defined in claim 1, including slidable connections for fixing lateral end portions of the shield to the vehicle body, said bumper being a substantially straight member.

6. A combined bumper and shield as defined in claim 5, wherein said slidable connections include rail engaging guide members on the shield, and rail members for attaching to the vehicle body.

7. A combined bumper and shield as defined in claim 6, wherein said guide members and rail members are adapted to disengage one another upon predetermined displacement of the shield towards the bumper in longitudinal direction of the vehicle.

8. A bumper for a motor vehicle having a U-shaped shield with a transverse portion attached to said bumper, central securing means between the bumper and the shield and comprising a headed attachment pin on the shield received in a substantially close-fitting hole in the bumper, a plurality of further securing means between the bumper and the shield each comprising a headed attachment pin on the shield received in a laterally elongated hole in the bumper, said securing means supporting the shield for displacement in the longitudinal direction of the vehicle towards the bumper, said shield having lateral end portions disposed in relation to the bumper to extend round the sides of the vehicle, said shield having ribbed areas engaging the bumper and forming an intermediate cushion between the bumper and the shield, said ribbed areas being located in regions of at least one of the attachment pins integrated into the ribbed areas.

9. A combined bumper and shield as defined in claim 8, wherein said ribbed areas comprise intersecting ribs forming pockets.

10. A combined bumper and shield as defined in claim 8, wherein said attachment pins hold the ribs in substantially light load engagement with the bumper.

11. A bumper for a motor vehicle having a U-shaped shield with a transverse portion attached to said bumper, central securing means between the bumper and the shield which is laterally stable in position, a plurality of further securing means which are laterally displaceable to a limited extent, said securing means supporting the shield for displacement in longitudinal direction of the vehicle towards the bumper, said shield having lateral end portions disposed in relation to the bumper to extend round the sides of the vehicle, and non-flexible supporting elements on the inside of the shield for engaging the bumper to receive and transmit impact energy from the shield to the bumper, said supporting elements being removably attached to the shield.

12. A combined bumper and shield as defined in claim 11, wherein said shield has ribbed areas engaging the bumper and forming an intermediate cushion between the bumper and the shield, said supporting elements being fixed to ribs of said ribbed areas.

13. A combined bumper and shield as defined in claim 12, wherein said ribs of said ribbed areas intersect one another to form pockets, said supporting elements comprising molded members integrated by a bridge-shaped connection, said molded members having gripping slits formed therebetween, said molded members being inserted each in an individual pocket of a ribbed area of the shield, said gripping slits gripping individual ribs separating the pockets.

14. A combined bumper and shield as defined in claim 12, wherein said supporting elements project of free edges of the ribs of said ribbed areas to support the shield directly on the bumper.

15. A motor vehicle bumper comprising: a metal bumper fastened to the motor vehicle; a flexible shield of synthetic material fastened to and enclosing said bumper, said shield being disposed with lateral ends towards the sides of the vehicle, said bumper comprising a straight section extending without lateral bends along the vehicle front side, said bumper carrying a main portion of said shield, said shield having on the inside support members tip-stretched in one piece, lateral ends of said shield movably fastened to mountings on chassis side surfaces; fastening pins said bumper being a rigid section with a main portion of said shield attached by said fastening pins, said fastening pins being tip-stretched in one piece on an inside of said shield; said fastening pins being inserted into holes on said bumper with a position-stable central securing means and a plurality of laterally restricted displaceable fastenings; mountings for lateral ends of said shield being formed as guide members for permitting vertical and lateral securing means but unimpeded displacement in a lengthwise vehicle direction; said support members being honeycombs for supporting said shield on said bumper as an intermediate cushion and being integral with said fastening pins as projecting hollow members; support elements of non-flexible solid material in said honeycombs in at least a few locations as molded members inserted in individual cells of said honeycombs.

16. A bumper as defined in claim 15, wherein height and length of said honeycombs is adapted to the length of said fastening pins such that said shield when fastened to said bumper is free of play and held by tension.

17. A bumper as defined in claim 15, wherein said supporting elements are fixed to the walls of said honeycombs in a manner selected from the group of clamping, detenting and hooking.

18. A bumper as defined in claim 15, including a plurality of said supporting elements integrated by an upper bridge-like connection into a member which can be grippingly inserted as a whole into several cavities of said honeycombs, gripping slits being formed between said molded members.

19. A bumper as defined in claim 15, wherein said support elements project wholly beyond a forward limiting rim of said honeycombs and support said shield directly on said bumper.

20. A bumper as defined in claim 15, wherein said support elements project locally beyond the forward limiting rim of said honeycombs and support said shield directly on said bumper.

* * * * *